(12) United States Patent
White

(10) Patent No.: US 6,232,368 B1
(45) Date of Patent: May 15, 2001

(54) ESTER CURED BINDERS

(75) Inventor: Kenneth B. White, Schaumburg, IL (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/415,814

(22) Filed: Oct. 12, 1999

(51) Int. Cl.$^7$ ........................................................ B22C 1/22
(52) U.S. Cl. ........................ 523/145; 523/139; 523/146; 164/527; 164/529; 419/44; 419/65; 427/198; 427/199; 524/141; 525/505
(58) Field of Search ................................... 523/145, 139, 523/146; 525/505; 524/141; 164/527, 529; 427/198, 199; 419/44, 65

(56) References Cited

U.S. PATENT DOCUMENTS

| | | | |
|---|---|---|---|
| 2,227,548 | 1/1941 | Long | 260/25 |
| 3,666,703 | * 5/1972 | Murata et al. | 260/29.3 |
| 3,892,903 | 7/1975 | Dowbenko | 428/460 |
| 4,649,181 | 3/1987 | Darms et al. | 525/524 |
| 4,942,217 | * 7/1990 | Gardziela et al. | 528/129 |
| 5,036,116 | 7/1991 | Iyer et al. | 523/145 |
| 5,160,503 | 11/1992 | Smith | 8/115.7 |
| 5,214,079 | 5/1993 | Gerber | 523/145 |
| 5,218,010 | 6/1993 | Gerber | 523/145 |
| 5,248,707 | * 9/1993 | Gerber | 523/145 |
| 5,294,649 | 3/1994 | Gerber | 523/145 |
| 5,340,888 | 8/1994 | Lemon et al. | 525/501 |
| 5,426,156 | 6/1995 | Bederke et al. | 525/426 |
| 5,552,488 | 9/1996 | Bradford et al. | 525/163 |

FOREIGN PATENT DOCUMENTS

78032374 * 9/1978 (JP).
84014817 * 1/1984 (JP).

* cited by examiner

*Primary Examiner*—Edward J. Cain
(74) *Attorney, Agent, or Firm*—Gardner, Carton & Douglas

(57) ABSTRACT

An embodiment of the present invention provides a method for improving the tensile strength of foundry cores and molds over what may be conventionally achieved. The use of acidic methylene compounds in binder compositions which include strongly alkaline phenolic resoles results in an ester curable binder that may be used to make foundry cores and molds having significantly greater tensile strengths than are achieved with prior art binders. An embodiment of the present invention provides a composition which includes a phenolic resole having a pH ranging from about 10.5 to about 13.5 and an acidic methylene compound.

38 Claims, No Drawings

ESTER CURED BINDERS

FIELD OF THE INVENTION

The present invention relates to an improved phenolic binder composition for use with ester-curatives to bind foundry cores and molds. The present invention also relates to a method for improving the strength of an ester-cured phenolic resin and the foundry cores and molds made using such a resin. This invention further relates to the reaction product of a resole, an acidic methylene compound, and an ester under strongly alkaline conditions.

BACKGROUND OF THE INVENTION

Binders or binder systems for foundry cores and molds are known. In the foundry art, cores or molds for making metal castings are normally prepared from a mixture of an aggregate material, such as sand, and a binding amount of a binder or binder system. Typically, after the aggregate material and binder have been mixed, the resulting mixture is rammed, blown or otherwise formed to the desired shape or pattern of the core or mold, and then cured to a solid using catalysts, heat, and/or a co-reactant.

Resin binders used in the production of foundry molds and cores are often cured at high temperatures to achieve the fast-curing cycles required in foundries However, resin binders have been developed which cure at low temperatures. These processes are preferred over high-temperature curing operations that have higher energy requirements and often emit undesirable fumes.

One group of processes which do not require heating in order to achieve curing of the resin binder are referred to as no-bake processes. In such processes, the binder components are coated on the aggregate material, such as sand, and the resulting mixture is rammed, blown or otherwise formed to the desired shape or pattern, either a core or mold. Curing of the binder is achieved without heating.

One such no bake process employs an aqueous alkaline solution of a phenolic resole resin as the binder. In this process, the foundry sand is usually mixed with an ester-curative before the solution of resole resin is added to the mixture. The process is described in detail in U.S. Pat. No. RE32,812 which is incorporated herein by reference in its entirety.

Another process which does not require the application of heat to cure a core or mold is the cold box ester-cured process. In this process, a foundry core or mold is prepared by mixing sand with an alkaline solution of a phenolic resole resin, discharging the mixture into a pattern, and curing the mixture by contacting the resin with a vaporous ester-curative. In the cold box ester-cured process, the phenolic resole resin may be cured with low molecular weight, gas phase, carboxylic acid esters, such as alkyl formates, including methyl formate and ethyl formate.

The ester cured process is superior to some of the earlier processes from an environmental standpoint. However, the initial tensile strengths of the cores and molds made by this process may be somewhat lower than those prepared by other binder processes.

In one prior art composition, in an attempt to improve the tensile strength of the cores and molds, the amount of phenolic resin present in the binder was increased, resulting in higher tensile strengths of the ester-cured resins. This was achieved by using a solution of a phenolic resin, either novolac or resole, in an organic ester-curative.

In yet another prior art composition, the compressive strength of cores made from an aggregate bound with a phenolic resole were improved by the incorporation of lightburned magnesia into the resin.

Compositions which accelerate the cure of an ester-cured phenolic resole are also disclosed in the prior art. However, accelerating the cure of a binder does not consistently result in an increase in the strength of the cured cores or molds.

In another prior art composition, a polyphenol is added to the phenolic resole resin in an attempt to improve the strength of a bound core or mold. The polyphenol resins are made by reacting a phenol or a substituted phenol with a peroxidase or an oxidase enzyme and peroxide in an organic solvent-containing medium.

Other attempts to improve the strength of cores and molds bound with an ester-cured phenolic resole have included the addition of a silane coupling agent to the aggregate or the binder. However, silane coupling agents are costly and do not always result in the desired strength improvement for a given application.

Each of the prior art compositions and methods for improving the strength of a core or mold bound with an ester-cured phenolic resole are not without disadvantages. Adding resin solids to the ester-curative has not always provided the needed strength improvement. Because the foundry binder systems are applied to an aggregate as liquid solutions, the use of a lightburned magnesia compound requires the dissolution of such compounds into the binder. This may represent a difficult step and an added cost to prepare such a solution. The use of a polyphenol requires the costly first step of preparing such a resin. The use of silane coupling agents also represent a significant added cost because such silanes themselves are costly and the use of a silane coupling agent does not always result in the desired strength improvement.

It would therefore be an advantage to have an ester-cured binder system that provides significantly stronger cores and molds. It would be yet a further advantage to have a method for improving the tensile strength of cores and molds bound with an ester-cured resin. It would be an even further advantage to provide an additional cross-linker to the cross-linking of alkaline phenolic resoles thereby providing additional strength to the cured resin.

SUMMARY OF THE INVENTION

Unexpectedly, in view of the foregoing difficulties, it has now been discovered that the tensile strength in cured cores and molds may be improved by using a new and improved ester curable phenolic binder, or, as an alternative embodiment, a new and improved ester-curative. In one embodiment, the new and improved ester curable phenolic binder comprises a phenolic resole having a pH of at least 10.5, and an acidic methylene compound. In an alternative embodiment, a new and improved ester-curative comprises an ester-curative and an acidic methylene compound.

In accordance with an alternate embodiment of the invention, a new and improved method for making foundry cores and molds having excellent tensile strength characteristics is provided. In an embodiment, the new and improved method comprises the steps of:

preparing a premix by combining:
aggregate; and
an improved ester curable phenolic resole having a pH of at least 10.5, until a substantially uniform premix is obtained;
shaping the premix to a desired configuration to provide a shaped premix;
introducing a gaseous ester-curative to the shaped premix; and thereafter, curing the shaped premix to provide a shaped foundry article.

In accordance with yet another alternate embodiment of the invention, a new and improved method for making foundry cores and molds having excellent tensile strength characteristics is provided. In this embodiment, the new and improved method comprises the steps of:

preparing a premix by combining:
aggregate; and
an improved ester curable phenolic resole having a pH of at least 10.5; and
an ester-curative, until a substantially uniform premix is obtained;
shaping the premix to a desired configuration to provide a shaped premix; and
thereafter, curing the shaped premix to provide a shaped foundry article.

A major advantage provided in accordance with the invention is that significantly stronger cores and molds are provided than were heretofore obtainable with prior art ester-cured binder systems. Another advantage provided by the present invention is that a new cross-linker is provided for cross-linking alkaline phenolic resole resin compositions. A further advantage provided by the present invention is that cured foundry shaped articles having improved strength may be provided. Still another advantage is that a new and improved method for improving the tensile strength of cores and molds with an ester-cured resin is provided.

Other aspects and advantages of the present invention will become apparent from the following Detailed Description and the examples.

DETAILED DESCRIPTION OF THE INVENTION

According to one embodiment of the present invention, there is provided a composition that results in an increased tensile strength of foundry cores and molds as compared to the prior art. It has been determined that a combination of an acidic methylene compound with an alkaline phenolic resole results in a curable binder system which, after curing, provides shaped articles exhibiting improved mechanical properties including improved strength. The acidic methylene compound may be a Michael Addition reaction donor. The acidic methylene compound may be reactive with quinone methide terminal groups on the alkaline phenolic resole formed during curing of the binder system.

The composition of one embodiment of the present invention is useful as a foundry binder in combination with an ester-curative. Such a foundry binder will bind together aggregate material, typically sand, in a pre-formed shape. In the no-bake process, referred to above, a foundry core or mold is prepared by mixing sand with an alkaline solution of a phenolic resole resin and a liquid ester-curative, discharging the mixture into a pattern, and curing the mixture. Similarly, in the cold box process a foundry core or mold is prepared by mixing sand with an alkaline solution of a phenolic resole resin, discharging the mixture into a pattern, and curing the mixture by passing a gaseous ester through the mixture of sand and resin.

A modified resole component made according to one embodiment of the present invention includes a phenolic resole, as described above, and an acidic methylene compound. Such a modified resole is useful, in combination with an ester-curative, also described above, in making a binder for foundry cores and molds. The foundry cores and molds made using such a binder demonstrate improvements in tensile strength over cores and molds made using the binders of the prior art. In an alternative embodiment, the acidic methylene compound may be separately added to either the aggregate material, the phenolic resole, or the ester-curative.

Acidic Methylene Compounds

The acidic methylene compounds may function as Michael Addition reaction donors. Accordingly, an equilibrium product of an acidic methylene compound with a base, such as a carbanion, may react, for example, with any quinone methides present in a binder system which are formed during curing of the binder system. A quinone methide is an equilibrium product of the reaction of, for example, a methylol phenol and an ester in the presence of a strong base such as potassium hydroxide. The methylol phenol is a functional end-group of the phenolic resole where the resole includes alkaline reaction products of phenol and formaldehyde. Those skilled in the art will recognize other acidic methylene compounds that may be useful in embodiments of the present invention.

Examples of acidic methylene compounds useful in embodiments of the present invention include compounds of the following structure:

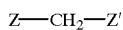

where Z and Z' may be the same or different and may include —CN, —CO$_2$R, —CONR$_2$", —CONHR",

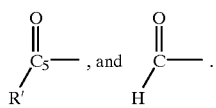

R, R' and R" in this example may be the same or different and include branched and unbranched alkyl and alkenyl groups having from C$_1$ to C$_{10}$ carbon atoms, and aryl groups including substituted aryl groups. One example of the methylene compounds described above is malononitrile, available from Aldrich Chemical Company, Inc., Milwaukee, Wis.

A subgroup of the acidic methylene compounds described above include the preferred 2,4-pentanedione, but generally include compounds of the following structure:

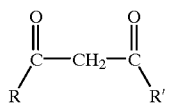

where R and R' may be the same or different and include branched and unbranched alkyl and alkenyl groups having from C$_1$ to C$_{10}$ carbon atoms and aryl groups including substituted aryl groups. 2,4-pentanedione is available commercially from Aldrich Chemical Company, Inc., Milwaukee, Wis.

Cyclic acidic methylene compounds are also useful in embodiments of the present invention. An example of such cyclic acidic methylene compounds is presented below.

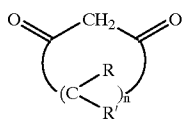

Here, n≧2 and R and R' may be the same and different and may include hydrogen, aryl groups, including substituted aryl groups, and alkyl and alkenyl groups having from $C_1$ to $C_{10}$ carbon atoms. A specific example of one such cyclic acidic methylene compound particularly useful in embodiments of the present invention is 1,3-cyclohexanedione. 1,3-cyclohexanedione is available commercially from Aldrich Chemical Company, Inc., Milwaukee, Wis.

As provided above, the acidic methylene compounds may be combined with an alkaline phenolic resole to form a modified binder system, the acidic methylene compound may be pre-blended with an ester-curative, or the acidic methylene compound may be added separately to an aggregate. The acidic methylene compound is used in an amount that is from about 0.5% to about 8%, based on the combined weight of the alkaline resole resin and the acidic methylene compound. This usage level would apply where the acidic methylene compound is added to the resole, the ester-curative, or the aggregate.

Phenolic Resole

Resole resins are thermosetting, i.e., they form an infusible three-dimensional polymer upon application of heat and are produced by the reaction of a phenol and a molar excess of a phenol-reactive aldehyde typically in the presence of an alkali or alkaline earth metal compound as a condensing catalyst.

The phenolic resole which may be used with the embodiments of the present invention may be obtained by the reaction of a phenol, such as phenol itself, cresol, resorcinol, 3,5-xylenol, bisphenol-A, other substituted phenols, and mixtures of any of these compounds, with an aldehyde such as, for example, formaldehyde, acetaldehyde, furfuraldehyde, and mixtures of any of these aldehydes. Typically, phenol and formaldehyde are reacted in a molar ratio of phenol to formaldehyde in the range of about 1:1 to about 1:3.

A broad range of phenolic resoles in fact may be used with the various embodiments of this invention. These can be phenol-formaldehyde resoles or those where phenol is partially or completely substituted by one or more reactive compounds such as cresol, resorcinol, 3,5-xylenol, bisphenol-A, or other substituted phenols and the aldehyde portion can be partially or wholly replaced by acetaldehyde, glutaraldehyde, dialdehydes generally, furfuraldehyde, benzaldehyde. The preferred phenolic resole resin is the condensation product of phenol and formaldehyde.

The phenolic resoles are condensed using suitable alkaline materials. Such alkaline materials may include sodium hydroxide, potassium hydroxide, lithium hydroxide, and mixtures of these compounds. The preferred alkaline material is potassium hydroxide. A part of the alkaline material may be provided by substituting for a part of the alkali metal hydroxide a divalent metal hydroxide such as, for example, magnesium hydroxide and calcium hydroxide. The alkali:phenol molar ratio is typically from about 0.2:1 to about 1.2:1 and results in a alkaline phenolic resole product having a pH of at least 10.5, and preferably ranging from about 10.5 to about 13.5.

Suitable phenolic resoles generally are those having a weight average molecular weight of from about 500 to about 2500, as determined by gel permeation chromatography (GPC).

The phenolic resoles useful with the embodiments of the present invention are typically aqueous solutions of the phenolic resin. Such aqueous solutions generally have a solids contents in the range from about 40% to about 75% by weight. The Brookfield viscosity of such solutions is generally in the range from about 50 centipoise ("cps") to about 750 cps at 25° C. The Brookfield viscosity may be determined using an RVF Model Brookfield viscometer with a No. 1 spindle at 20 r.p.m., at 25° C.

The liquid portion of the resin is water or water in combination with a non-reactive solvent. The resin can include a number of optional modifiers or additives such as silanes, hexamethylenetetramine, or urea. Solvents in addition to water can be selected from alcohols of 1 to 5 carbon atoms, diacetone alcohol, glycols of 2 to 6 carbon atoms, mono- and dimethyl or butyl ethers of glycols, low molecular weight (200–600) polyethylene glycols and methyl ethers of the glycols, phenolics of 6 to 15 carbon atoms, phenoxyethanol, aprotic solvents, e.g., N,N-dimethylformamide, N,N-dimethylacetamide, 2-pyrrolidone, N-methyl-2-pyrrolidone, dimethyl sulfoxide, tetramethylene sulfone, hexamethylphosphoramide, tetramethyl urea, methyl ethyl ketone, methyl isobutyl ketone, cyclic ethers such as tetrahydrofuran and m-dioxolane, and the like.

One preferred resin binder is the BETASET 9512 alkaline phenolic resin, made and sold by Borden Chemical, Inc., Louisville, Ky. This resin has a viscosity of about 150 cps, a solids content of about 53%, specific gravity of about 1.25, pH of about 12.1, free phenol content of about 1.5%, free formaldehyde of 0.5% maximum, and a nitrogen content of about 1%. BETASET 9512 derives its alkalinity predominantly from potassium hydroxide and may be described as a potassium-based resin.. It is ester-curable, preferably using an ester in vapor or entrained droplet form, to cure by gassing. Other embodiments may include other alkaline phenolic resoles.

Another preferred binder is the ALPHASET 9040 alkaline phenolic resin, made and sold by Borden Chemical, Inc., Louisville, Ky. This resin has a viscosity of about 100 cps, a solids content of about 47%, specific gravity of about 1.23, pH of about 13.0, free phenol content of about 0.5%, free formaldehyde of 0.25% typical, and a nitrogen content of less than about 1%. It is ester-curable, preferably using a liquid ester. Other embodiments may include other alkaline phenolic resoles. ALPHASET 9040 derives its alkalinity predominantly from sodium hydroxide and may be described as a sodium-based resin.

Silanes are commonly added to phenolic foundry resins to improve the adhesion to the sand and the tensile strengths of the molds and cores produced from the resins. Amounts as low as 0.05% by weight, based on the weight of the phenolic resin, have been found to provide significant improvements in tensile strength. Higher amounts of silane generate greater improvements in strength up to quantities of about 0.6% by weight or more.

The silanes are used in a quantity sufficient to improve adhesion between the resin and aggregate. Typical usage levels of these silanes are 0.1 to 1.5% based on resin weight. Useful silanes include γ-aminopropyltriethoxysilane, 2-(3,4-epoxycyclohexyl)ethyl trimethoxysilane, bis(trimethoxysilylpropyl)ethylenediamine, N-trimethoxysilylpropyl-N,N,N-trimethylammonium chloride and secondary amino silane.

The amount of alkaline phenolic resole in the binder must be sufficient to provide the necessary bond between sand particles. Quantities of the binder, in the range of about 0.5% to about 8% by weight, based on the weight of sand, are preferred and amounts below about 2% by weight are most preferred, where the phenolic resole resin solution is at a solids content of about 30% to about 75% by weight and preferably about 40% to about 60% by weight.

Ester-Curative

The ester functional hardening agent, also referred to as the ester-curative, accelerates the hardening of the resole and may be introduced to the resole as a liquid or as a gas. The ester functionality for hardening of the phenolic resole resin can be provided by lactones, cyclic organic carbonates, carboxylic acid esters, or mixtures of these compounds. Phenolic resin-modified, ester-curatives, as are described in U.S. Pat. Nos. 4,988,745 and 5,036,116, may also be used.

Generally, low molecular weight lactones, such as β or γ-butyrolactone, γ-valerolactone, caprolactone, β-propiolactone, β-isobutyrolactone; β-isopentyllactone, γ-isopentyllactone, and δ-pentyllactone may be suitable as the ester-curative. Examples of suitable cyclic organic carbonates include, but are not limited to: propylene carbonate; ethylene glycol carbonate; 1,2-butanediol carbonate; 1,3-butanediol carbonate; 1,2-pentanediol carbonate; and 1,3-pentanediol carbonate. Generally, carboxylic acid esters such as phenolic esters and aliphatic esters may also be used.

The aliphatic esters may be of short or medium chain length,. For example, esters having a chain length of about 1 to 10 carbon atoms may be suitable. Also, mono- or polyhydric, saturated or unsaturated esters with short or medium chain length may be used as ester-curatives. Esters of carboxylic acids having a chain length of about 1 to 10 carbon atoms, may also be suitable. Aliphatic esters of alkyl, mono-, di-, or trihydric alcohols with alkyl, or mono-, or diunsaturated acids which can be mono-, di-, or tricarboxylic, may be suitable as ester-curatives. The carboxylic acid esters can also be substituted with hydroxy, cyano, chloro, or bromo groups. Esters where at least one substituent to the ester functional group is an aryl compound may also be used.

Suitable aromatic esters may be obtained by esterifying the aromatic, e.g., phenolic, group or groups of a mono- or polyhydric aromatic phenol to produce a formate or acetate. Additionally, the aromatic ester can be an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxyl group.

It will be understood that the esterified phenolic compound used may be a mono-, a di-or a polyesterified methylolated mono-, di- or polynuclear phenol with at least one esterified methylol group attached to an aromatic ring carbon ortho or para to a phenolic hydroxyl group or esterified phenolic hydroxyl group. The acid portion of the phenolic esters may be the same as those of the aliphatic esters.

Specific carboxylic acid esters include but are not limited to: n-butyl formate; ethylene glycol diformate; methyl and ethyl lactates; hydroxyethyl acrylate; hydroxyethyl methacrylate; n-butyl acetate; ethylene glycol diacetate; triacetin (glycerol triacetate); diethyl fumarate; dimethyl maleate; dimethyl glutarate; dimethyl adipate; 2-acetyloxymethyl phenol; 2-methacryloyloxymethyl phenol; 2-salicyloyloxymethyl phenol; 2-acetyloxymethyl phenol acetate; 2,6-diacetyloxymethyl p-cresol; 2,6-diacetyloxymethyl p-cresol acetate; 2,4,6-triacetyloxymethyl phenol; 2,4,6-triacetyloxymethyl phenol acetate; 2,6-diacetyloxymethyl phenol acetate;.2,2',6,6'-tetraacetyloxymethyl Bisphenol A; and 2,2',6,6'-tetraacetyloxymethyl Bisphenol A diacetate. Also, cyanoacetates derived from aliphatic alcohols having a chain length of from about 1 to 5 carbon atoms make suitable ester-curatives. Formates and acetates of benzyl alcohol, α,α-dihydroxyxylenols, phenol, alkyl substituted phenols, dihydroxybenzenes, bisphenol A, bisphenol F, or low molecular weight resoles may be used as ester-curatives. At times, it is advantageous to use mixtures of the ester functional hardening agents.

The ester-curative is present in an amount sufficient to increase the tensile and compressive strength of the hardened composition. Such quantity will vary over a broad range. An ester-curative may be used in an amount that is from about 5% to 40% by weight of the phenolic resole resin and preferably from about 15% to 30% by weight of the resin. The exact quantity will depend on the particular ester-curative used and the temperature at which cure occurs. If an acidic methylene compound is to be pre-blended with the ester-curative, the ester-curative may be present in an amount of from about 1% to about 100% of the weight of the liquid ester-curative. This range allows for the addition of about 0.5% to about 8% of the acidic methylene compound, based on the combined weight of the acidic methylene compound, when the pre-blended ester-curative and an alkaline resole binder are combined together with an aggregate.

Gaseous esters, such as $C_1$ to $C_3$ alkyl formates, may be used as ester-curatives in the cure of aggregates, lignocellulosic composites, and in low density articles or when applying the binders to fabric or paper substrates. Methylacetate may also be used as a gaseous ester-curative. When gaseous esters are used as curatives, the ester is generally not pre-mixed with the resin binder, but rather is supplied as a gas to the shaped article as is well known in the art.

The relative volatility of alkyl formates enables their use as gaseous curing agents. Thus, methyl formate, which is a volatile liquid having a boiling point at atmospheric pressure of about 31.5° C., is a generally a suitable curing agent. At ambient temperatures, methyl formate is sufficiently volatile that passing a carrier gas through liquid methyl formate produces a concentrated methyl formate vapor. In typical applications, heat is applied to the gaseous ester to facilitate handling. Ethyl and propyl formates although less volatile than the methyl ester, may also be used as ester-curatives.

The concentration of formate in the carrier gas is typically at least 10% by volume and may range from about 20% to about 99% by volume. The total amount of alkyl formate used will typically be from about 10% to about 110% by weight, based on the weight of the phenolic resin solution. The time required for adequate gassing depends on the size and complexity of the core or mold and on the particular resin used. The gassing procedure is described more particularly in U.S. Pat. No. 4,468,359.

The aggregate material commonly used in the foundry industry include silica sand, construction aggregate, quartz, chromite sand, zircon sand, olivine sand, or the like. Reclaimed sand, that is sand that may have been previously bonded with an ester cured alkaline phenolic resin binder, or other binder system, may also be used.

Sand sold under the product designation F-5574, available from Badger Mining Corporation, Berlin, Wis., is useful in making cores and molds and in testing the embodiments of the present invention. Likewise, sand sold under the product designation Wedron 530, available from Wedron Silica, a division of Fairmount Minerals, Wedron, Ill., is also useful. Sand sold under the product designation Nugent 480, available from Nugent Sand Company, Muskegon, Mich., may also be used. Where alkaline resoles are used in the binder system, the sand type will affect the strength development of the bound aggregate.

Foundry Cores and Molds

In general, the process for making foundry cores and molds in accordance with an embodiment of this invention comprises admixing aggregate material with at least a binding amount of the phenolic resole component. An acidic methylene compound may be subsequently added to the aggregate material. Preferably, the process for making foundry cores and molds in accordance with this invention includes admixing aggregate material with at least a binding amount of the modified phenolic resole component containing an acidic methylene compound described above, where the modified phenolic resole component contains an acidic methylene compound. In the case where the aggregate admixture is to be cured using the no bake process, a suitable liquid ester-curative is also admixed with the aggregate material. The admixture is suitably manipulated, as for example, by distributing the same in a suitable core box or pattern. The admixture is cured forming a shaped product.

There is no criticality in the order of mixing the constituents with the aggregate material except where a gaseous ester-curative is used, in which case the ester-curative is passed through the admixture after it is shaped. On the other hand, it is preferred to add the ester-curative, in the case of the no bake process, as the last constituent of the composition so that premature reaction between the components does not take place. The components may be mixed with the aggregate material either simultaneously or one after the other in suitable mixing devices, such as mullers, continuous mixers, ribbon blenders and the like, while continuously stirring the admixture to insure uniform coating of aggregate particles.

When the admixture is to be cured according to cold box procedures, the admixture after shaping as desired, is subjected to gassing with a vaporous ester-curative as described above. Sufficient ester-curative is passed through the shaped admixture to provide substantially complete reaction between the components. The flow rate of the ester-curative is dependent, of course, on the size of the shaped admixture as well as the amount of phenolic resin therein.

In contrast, however, when the admixture is to be cured according to no bake process, the ester-curative is generally added in liquid form to the aggregate material with the phenolic resole component. The admixture is then shaped and simply permitted to cure until reaction between the components is substantially complete, thus forming a shaped product such as a foundry core or mold. On the other hand, the ester-curative may also be admixed with the resole component prior to coating of the aggregate material with the components.

Consequently, by so proceeding, with an admixture of foundry sand and a binding amount of the phenolic resole and acidic methylene components with the ester-curative, there is formed a foundry core or mold comprising foundry sand and a binding amount of a binder composition comprising the reaction product of the phenolic resole, the acidic methylene component, and the ester-curative.

Tensile strengths of the cores prepared as noted above were determined using a Thwing-Albert Tensile Tester (Philadelphia, Pa.). This device consists of jaws that accommodate the ends of a "dog-bone-shaped" test core. A load is then applied to each end of the test core as the jaws are moved away from each other. The application of an increasing load continues until the test core breaks. The load at this point is termed the tensile strength, and it has units of psi (pounds per square inch).

The advantages of this invention and its preferred embodiments will be demonstrated more fully by the following Examples, that demonstrate the practice of the invention. In these Examples, and elsewhere throughout the specification, parts and percentages are by weight, and temperatures are in degrees Celsius, unless expressly indicated to be otherwise.

Test Cores—Cold Box Examples

Test cores were prepared by the following method: to a quantity of about 2.5 kg washed and dried aggregate material was added an amount of either a phenolic resole or a modified phenolic binder of the present invention and the mixture was stirred for about three minutes in a Hobart Kitchen Aid Mixer. This mixture was then used immediately to form standard American Foundrymen Society's 1-inch dog bone tensile specimens in a standard core box. The cores were cured at room temperature using vaporous methyl formate and the samples were broken at various time intervals after the mix was made. The cores were stored in an open laboratory environment, at ambient temperatures, until tested. Tensile strength measurements were made as described above. Average values for 3 to 4 tensile strength measurements were recorded.

Test Cores—No Bake Examples

Test cores were prepared by the following method: to a quantity of about 2.5 kg washed and dried aggregate material was added an amount of either a phenolic resole or a modified binder of the present invention and the mixture was stirred for one minute in a Hobart Kitchen Aid Mixer. Then, a liquid ester curative was added. This mixture was stirred for an additional 30 seconds and then used immediately to form standard American Foundrymen Society's 1-inch dog bone tensile specimens in a Dietert 696 core box. The cores were cured at room temperature and the samples were broken at various time intervals after the mix was made. The cores were stored in an open laboratory environment, at ambient temperatures, until tested. Tensile strength measurements were made as described above. Average values for 3 to 4 tensile strength measurements were recorded.

EXAMPLE 1

Effect of Adding 2,4-Pentanedione To A Phenolic Resole

In this example, 2.5% of 2,4-pentanedione, on a weight per weight basis, was mixed with BETASET 9512 thus forming a modified binder. The modified binder was blended with F-5574 sand in amount of about 1.75% binder based on the weight of sand. Test cores were made, as described above, using methyl formate as the ester-curative. The tensile strength results are provided in Table 1 below and identified as Example 1. Control cores were made using 1.75% of BETASET 9512, based on the weight of sand, and F-5574 sand. The tensile strength results for the control cores are identified as Control I in Table 1 below.

TABLE 1

Tensile Strength Improvement In Cold Box Process
1.75% Binder; F-5574 Sand at 21.5° C.

| | Tensile Strength, psi | | |
|---|---|---|---|
| Core Age | Control 1 | Example 1 | % Improvement |
| 1 minute | 116 | 156 | 25.6 |
| 30 minutes | 167 | 238 | 29.8 |
| 24 hours | 217 | 280 | 22.5 |

As the results of Table 1 illustrate, the use of the modified binder of the present invention results in an unexpected improvement in the tensile strength. Accordingly, with the addition of 2,4-pentanedione to BETASET 9512, the tensile strength of cores was improved by an average of more than 25%.

EXAMPLES 2 AND 3

Effect of pH And The Use Of 2,4-Pentanedione On Tensile Strength

In these examples, 2.5% of 2,4-pentanedione, on a weight per weight basis, was mixed with BETASET 9512 thus forming a modified binder. An aliquot of the modified binder was pH adjusted using a 45% aqueous solution of potassium hydroxide (KOH) added in an amount of about 2% based on the weight of the modified binder. The addition of KOH further increases the alkalinity of BETASET 9512 which itself has a nominal pH of about 12. The pH adjusted modified binder, the neat modified binder and a control consisting of BETASET 9512 were compared for tensile strength development properties. Each binder was blended with Construction Aggregate sand in amount of about 2.20% binder based on the weight of sand. Test cores were made, as described above, using methyl formate as the ester-curative. The tensile strength results are provided in Table 2 below.

TABLE 2

Effect of pH On Tensile Strength Improvement In Cold Box Process
2.20% Binder; Construction Aggregate at about 20° C.

| | Tensile Strength, psi | | |
|---|---|---|---|
| Core Age | Control 2 pH = 12.19 | Example 2 pH = 11.94 | Example 3 pH = 12.13 +2% KOH |
| 1 minute | 105 | 123 | 129 |
| 30 minutes | 123 | 155 | 155 |
| 96 hours | 162 | 195 | 196 |

As the results illustrated in Table 2 demonstrate, the use of a binder containing an acidic methylene compound results in a significant improvement in the tensile strength of cores made with that binder on Construction Aggregate. In Example 3, the addition of 2% KOH was not detrimental to tensile strength development.

EXAMPLES 4 AND 5

Effect of pH, Sample Age And The Use Of 2,4-Pentanedione On Tensile Strength

In these examples, 2.5% of 2,4-pentanedione, on a weight per weight basis, was mixed with BETASET 9512 thus forming a modified binder. An aliquot of the modified binder was pH adjusted using a 45% aqueous solution of potassium hydroxide (KOH) added in an amount of about 2% based on the weight of the modified binder. The pH adjusted modified binder, the neat modified binder and a control consisting of BETASET 9512 were allowed to stand for seven days at room temperature before being subjected to testing. After the seven day aging period, each binder was blended with F-5574 sand in amount of about 1.75% binder based on the weight of sand. Test cores were made, as described above, using methyl formate as the ester-curative. The tensile strength results are provided in Table 3 below.

TABLE 3

Effect of KOH And Sample Age On Tensile Strength Improvement
In Cold Box Process - Samples Aged 7 Days At Room Temperature
1.75% Binder; F-5574 sand at 18.0° C.

| | Tensile Strength, psi | | |
|---|---|---|---|
| Core Age | Control 3 | Example 4 | Example 5 +2% KOH |
| 1 minute | 106 | 127 | 135 |
| 30 minutes | 146 | 198 | 184 |
| 72 hours | 198 | 211 | 219 |

The results of Table 3 demonstrate that on F-5574 sand not only does the use of an acidic methylene compound provide for a improvement in tensile strength, but the addition of 2% KOH may provide an even further improvement in tensile strength. For example, at one minute of core age the addition of 2% KOH to a modified binder yields a 5.9% improvement in tensile strength compared to the use of the modified binder alone. This suggests that tensile strengths may be even further improved by further increasing the alkalinity of the modified binder. However, the further addition of base is not required.

EXAMPLE 6

Effect of pH And The Use Of 2,4-Pentanedione On Tensile Strength

In this examples, 2.5% of 2,4-pentanedione, on a weight per weight basis, was mixed with BETASET 9512 thus forming a modified binder. An aliquot of the modified binder was pH adjusted using a 45% aqueous solution of potassium hydroxide (KOH) added in an amount of about 2% based on the weight of the modified binder. The pH adjusted modified binder and a control consisting of BETASET 9512 were compared for tensile strength development properties. Each binder was blended with 530 sand in amount of about 1.75% binder based on the weight of sand. Test cores were made, as described above, again using methyl formate as the ester-curative. The tensile strength results are provided in Table 4 below.

TABLE 4

Tensile Strength Improvement In Cold Box Process
Effect of Added KOH
1.75% Binder; 530 Sand at 25.0° C.

Tensile Strength, psi

| Core Age | Control 4 | Example 6 +2% KOH | % Improvement |
|---|---|---|---|
| 1 minute | 108 | 139 | 22.3 |
| 30 minutes | 139 | 196 | 29.1 |
| 24 hours | 181 | 220 | 17.7 |

As illustrated in Table 4, the use of a pH adjusted modified binder generates significant improvements in tensile strength where 530 sand is used. The magnitude of the improvement for the results presented in Table 4 is consistent with the results realized where sand other than 530 sand was used.

EXAMPLE 7

Effect of pH And The Use Of 2,4-Pentanedione On Tensile Strength

In this examples, 2.5% of 2,4-pentanedione, on a weight per weight basis, was mixed with BETASET 9512 thus forming a modified binder. An aliquot of the modified binder was pH adjusted using a 45% aqueous solution of potassium hydroxide (KOH) added in an amount of about 2% based on the weight of the modified binder. The pH adjusted modified binder and a control consisting of BETASET 9512 were compared for tensile strength development properties. Each binder was blended with 480 sand in an amount of about 2.00% binder based on the weight of sand. Test cores were made, as described above, using methyl formate as the ester-curative. The tensile strength results are provided in Table 5 below.

TABLE 5

Tensile Strength Improvement In Cold Box Process
Effect of Added KOH
2.0% Binder; 480 Sand at 25.0° C.

Tensile Strength, psi

| Core Age | Control 5 | Example 7 +2% KOH | % Improvement |
|---|---|---|---|
| 1 minute | 113 | 132 | 14.4 |
| 30 minutes | 150 | 168 | 10.7 |
| 24 hours | 177 | 189 | 12.0 |

As before, the use of an acidic methylene compound in a binder results in tensile strengths greater than that realized where the acidic methylene compound is not used. This example also serves to illustrate that the effect of using an acidic methylene compound to modify a binder will vary with the type of sand used in the testing.

EXAMPLES 8, 9 AND 10

Tensile Strength Development In Cold Box Process
Effect of A Greater Amount of 2,4-Pentanedione In the following examples, the effect of adding increasing amounts of an acidic methylene compound to a phenolic resole on the tensile strength of test cores is illustrated. In these examples, 1%, 2.5% and 5% of 2,4-pentanedione ("2,4-PD"), on a weight per weight basis, was mixed with separate samples of BETASET 9512 thus forming a series of modified binders. The modified binders and a control consisting of BETASET 9512 were compared for tensile strength development properties. Each binder was blended with F-5574 sand in an amount of about 1.75% binder based on the weight of sand. Test cores were made, as described above, using methyl formate as the ester-curative. The tensile strength results are provided in Table 6 below.

TABLE 6

Tensile Strength Development In Cold Box Process
Effect of Amount of 2,4-Pentanedione
1.75% Binder; F-5574 Sand at about 20° C.

| Core Age | Control 6 | Example 8 | Example 9 | Example 10 |
|---|---|---|---|---|
| pH | 12.4 | 12.2 | 12.1 | 12.0 |
| % 2,4-pentanedione added | 0% | 1% | 2.5% | 5% |
| Tensile Strength, psi | | | | |
| 1 minute | 117 | 145 | 157 | 152 |
| 30 minutes | 155 | 219 | 228 | 232 |
| 24 hours | 213 | 243 | 255 | 239 |

As the data of Table 6 illustrates, there are significant increases in tensile strength as the amount of acidic methylene compound is increased from 0% through 2.5%. Unexpectedly, for the results of the above examples, increasing the amount of acidic methylene compound from 2.5% to 5% does not result in a further increase in the tensile strength of the test cores.

EXAMPLE 11

Tensile Strength Development In Cold Box Process Using A Sodium-Based Resin

In this example, 2.5% of 2,4-pentanedione, on a weight per weight basis, was mixed with ALPHASET 9040 thus forming a modified binder. The modified binder and a control consisting of ALPHASET 9040 were compared for tensile strength development properties. Each binder was blended with F-5574 sand in an amount of about 1.75% binder based on the weight of sand. Tested cores were made, as described above, using methyl formate as the ester-curative. The tensile strength results are provided in Table 7 below.

TABLE 7

Tensile Strength Improvement In Cold Box Process Using A Sodium-Based Resin
1.75% Binder, F-5574 Sand, 25° C.

| Core Age | Control 7 | Example 11 | % Improvement |
|---|---|---|---|
| 1 minute | 78 | 103 | 32.1 |
| 30 minutes | 96 | 121 | 26.0 |
| 24 hours | 58 | 140 | 141.0 |

As clearly demonstrated by the data of Table 7, the use of the modified binder of the present invention results in an unexpected improvement in the tensile strength development of a sodium-based resin cured with methyl formate. As shown, the tensile strength of cores was improved by more than 140% for the greatest improvement.

EXAMPLES 12 AND 13

Tensile Strength Development In Cold Box Process Using A Potassium-Based Resin Modified With 1, 3-Cyclohexanedione In this example, both 1% and 2.5% of 1,3-cyclohexanedione ("1,3-CHD"), on a weight per weight basis, were mixed with BETASET 9512 thus forming two different modified binders. The modified binders and a control consisting of BETASET 9512 were compared for tensile strength development properties. Each binder was blended with 530 sand in an amount of about 1.75% binder based on the weight of sand. Tested cores were made, as described above, using methyl formate as the ester-curative. The tensile strength results are provided in Table 8 below.

TABLE 8

Tensile Strength Improvement In Cold Box Process
Effect of 1,3-Cyclohexanedione Addition
1.75% Binder, 530 Sand, 25° C.

| Core Age | Control 8 | Example 12 +1% 1,3-CHD | Example 13 +2.5% 1,3-CHD |
|---|---|---|---|
| 1 minute | 122 | 144 | 154 |
| 30 minutes | 172 | 206 | 217 |
| 24 hours | 214 | 224 | 205 |

As demonstrated by the data of Table 8, 1,3-Cyclohexanedione is also useful in the modified binders of the present invention, and its use results in an unexpected improvement in the tensile strength development of a resin cured with methyl formate. As shown, the tensile strength of cores was improved by more than 25% for the greatest improvement.

EXAMPLE 14

Tensile Strength Development In Cold Box Process Using Resins Modified With Malononitrile In this examples, 2.5% of Malononitrile, on a weight per weight basis, was mixed with ALPHASET 9040 thus forming a modified binder. As provided above, ALPHASET 9040 is a sodium-based resin. The modified binder and control consisting ALPHASET 9040 were compared for tensile strength development properties. Each binder was blended with F-5574 sand in an amount of about 1.75% binder based on the weight of sand. Tested cores were made, as described above, using methyl formate as the ester-curative. The tensile strength results are provided in Table 9 below.

TABLE 9

Tensile Strength Improvement In Cold Box Process
Effect of Malononitrile Addition
1.75% Binder, F-5574 Sand, 25° C.

| Core Age | Control 9 ALPHASET 9040 | Example 14 |
|---|---|---|
| 1 minute | 80 | 84 |
| 30 minutes | 86 | 94 |
| 24 hours | 24 | 31 |

As demonstrated by the data of Table 9, Malononitrile is also useful in the modified binders of the present invention, and its use results in an unexpected improvement in the tensile strength development of a resin cured with methyl formate. As shown, the tensile strength of cores was improved by more than 29% for the greatest improvement.

The following examples illustrate embodiments of the present invention useful in no bake applications. The procedure used in mixing the binder system and aggregate, forming dog-bone-shaped test cores from the admixture, and testing the cured cores, is as described above.

EXAMPLE 15

Effect Of The Use Of 2,4-Pentanedione On Tensile Strength Development In The No Bake Process In this example, 2.5% of 2,4-pentanedione, on a weight per weight basis, was mixed with ALPHASET 9040 thus forming a modified binder. The modified binder and a control consisting of ALPHASET 9040 were compared for tensile strength development properties. Each binder was blended with 530 sand in an amount of about 1.50% binder based on the weight of sand. An ester-curative comprising γ-butyrolactone and a small amount of a conventional novolac resin dissolved into the γ-butyrolactone was added at 30% based on the amount of binder used. Test cores were made, as described above. The tensile strength results are provided in Table 10 below.

TABLE 10

Tensile Strength Improvement In No Bake Process
1.50% Binder; 30% Ester-curative; 530 Sand at 25° C.

| | Tensile Strength, psi | | |
|---|---|---|---|
| Core Age | Control 10 | Example 15 | % Improvement |
| 1 hour | 79 | 84 | 6.3 |
| 2 hours | 77 | 96 | 24.7 |
| 24 hours | 100 | 128 | 24.3 |

As the results of Table 10 illustrate, the use of the modified binder of the present invention results in an unexpected improvement in the tensile strength. Accordingly, with the addition of 2,4-pentanedione to ALPHASET 9040, the tensile strength of cores was improved by nearly 25% for the greatest improvement.

There has been provided in accordance with the present invention, an improved phenolic binder composition for use with ester-curatives to bind foundry cores and molds. There has also been provided in accordance with the present invention, a method for improving the strength of an ester-cured phenolic resin and the foundry cores and molds made using such an improved binder composition. There is further provided in accordance with the present invention, a composition relating to the reaction product of a resole, an ester-curative, and an acidic methylene compound under strongly alkaline conditions. While the invention has been described with specific embodiments, many alternatives, modifications and variations will be apparent to those skilled in the art in light of the foregoing description. Accordingly, it is intended to include all such alternatives, modifications and variations set forth within the spirit and scope of the appended claims.

What is claimed is:

1. A curable binder composition comprising:

a phenolic resole having a pH of at least 10.5; and an acidic methylene compound;

wherein the acidic methylene compound is selected from the group consisting of:

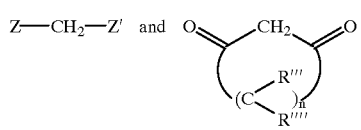

wherein Z and Z' may be the same or different and are selected from the group consisting of —CN, —CO$_2$R, —CONR$_2$", —CONHR",

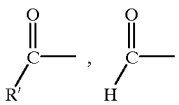

and combinations thereof;

further wherein R, R' and R" which may be the same or different are selected from the group consisting of branched and unbranched alkyl and alkenyl groups having from C$_1$ to C$_{10}$ carbon atoms and aryl groups including substituted aryl groups;

further wherein, n≧2; and further wherein R'" and R"" may be the same or different and are selected from the group consisting of hydrogen, aryl groups, including substituted aryl groups, and alkyl and alkenyl groups having from C$_1$ to C$_{10}$ carbon atoms.

2. The composition of claim 1 wherein the phenolic resole has a pH ranging from about 10.5 to about 13.5.

3. The composition of claim 1 wherein the acidic methylene compound is malononitrile.

4. The composition of claim 1 wherein the acidic methylene compound is a compound of the following formula:

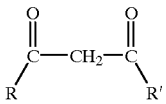

wherein R and R' may be the same or different and include branched and unbranched alkyl and alkenyl groups having from C$_1$ to C$_{10}$ carbon atoms and aryl groups including substituted aryl groups.

5. The composition of claim 1 wherein the acidic methylene compound is 2,4-pentanedione.

6. The composition of claim 1 wherein the acidic methylene compound is 1,3-cyclohexanedione.

7. The composition of claim 1 wherein the acidic methylene compound is present in an amount of from about 0.5% to about 8% based on the total weight of the binder composition.

8. The composition of claim 1 wherein the phenolic resole is a potassium-based resin.

9. The composition of claim 1 wherein the phenolic resole is a sodium-based resin.

10. The composition of claim 1 further comprising a base.

11. The composition of claim 10 wherein the base is selected from the group consisting of potassium hydroxide, sodium hydroxide, lithium hydroxide, and combinations thereof.

12. A ester-curative composition comprising:
   an ester-curative; and
   an acidic methylene compound;
   wherein the acidic methylene compound is selected from the group consisting of:

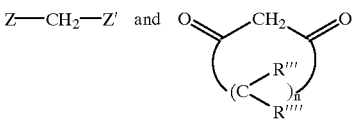

wherein Z and Z' may be the same or different and are selected from the group consisting of —CN, —CO$_2$R, —CONR$_2$", —CONHR",

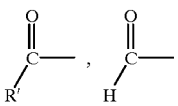

and combinations thereof;

further wherein R, R' and R" which may be the same or different are selected from the group consisting of branched and unbranched alkyl and alkenyl groups having from C$_1$ to C$_{10}$ carbon atoms and aryl groups including substituted aryl groups;

further wherein, n≧2; and further wherein R'" and R"" may be the same or different and are selected from the group consisting of hydrogen, aryl groups, including substituted aryl groups, and alkyl and alkenyl groups having from C$_1$ to C$_{10}$ carbon atoms.

13. The composition of claim 12 wherein the acidic methylene compound is present in an amount of from about 1% to about 99% of the weight of the ester-curative.

14. The composition of claim 12 wherein the ester-curative is selected from the group consisting of triacetin, dimethyl glutarate, dimethyl adipate and combinations thereof.

15. The composition of claim 12 wherein the ester-curative is selected from the group consisting of γ-butyrolactone, γ-valerolactone, caprolactone, β-propiolactone, β-butyrolactone, β-isobutyrolactone; β-isopentyllactone, γ-isopentyllactone, δ-pentyllactone, and mixtures of any two or more of the foregoing.

16. A composition comprising the reaction product obtained by admixing:
   a phenolic resole having a pH of at least 10.5;
   an ester-curative; and
   an acidic methylene compound;
   wherein the acidic methylene compound is selected from the group consisting of:

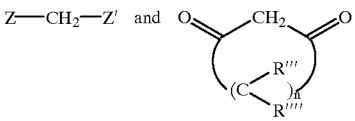

wherein Z and Z' may be the same or different and are selected from the group consisting of —CN, —CO$_2$R, —CONR$_2$", —CONHR",

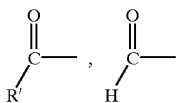

and combinations thereof;

further wherein R, R' and R" which may be the same or different are selected from the group consisting of branched and unbranched alkyl and alkenyl groups having from $C_1$ to $C_{10}$ carbon atoms and aryl groups including substituted aryl groups;

further wherein, $n \geq 2$; and further wherein R''' and R'''' may be the same or different and are selected from the group consisting of hydrogen, aryl groups, including substituted aryl groups, and alkyl and alkenyl groups having from $C_1$ to $C_{10}$ carbon atoms.

17. The composition of claim 16 wherein the phenolic resole has a pH ranging from about 10.5 to about 13.5.

18. The composition of claim 16 wherein the acidic methylene compound is present in an amount of from about 0.5% to about 8% based on the combined weight of the phenolic resole and the acidic methylene compound.

19. The composition of claim 16 wherein the phenolic resole is a potassium-based resin.

20. The composition of claim 16 wherein the phenolic resole is a sodium-based resin.

21. A composition comprising a reaction product obtained by:

reacting a phenolic resole, an ester-curative, and a base to provide a quinone methide; and thereafter reacting the quinone methide with a carbanion to provide the reaction product.

22. The composition of claim 21 wherein the carbanion is an equilibrium product of an acidic methylene compound with a base.

23. The composition of claim 22 wherein the acidic methylene compound is a compound of the following formula:

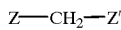

where Z and Z' may be the same or different and are selected from the group consisting of —CN, —$CO_2R$, —$CONR_2$", —CONHR"

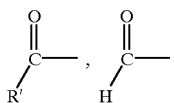

and combinations thereof;

further wherein R, R' and R" which may be the same or different are selected from branched and unbranched alkyl and alkenyl groups having from $C_1$ to $C_{10}$ carbon atoms and aryl groups including substituted aryl groups.

24. The composition of claim 22 wherein the acidic methylene compound is a compound of the following formula:

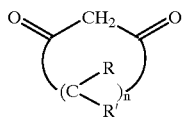

wherein, $n \geq 2$; and wherein R and R' may be the same or different and are selected from the group consisting of hydrogen, aryl groups, including substituted aryl groups, and alkyl and alkenyl groups having from $C_1$ to $C_{10}$ carbon atoms.

25. The composition of claim 22 wherein the acidic methylene compound is present in an amount of from about 0.5% to about 8% based on the combined weight of the phenolic resole and the acidic methylene compound.

26. A method for preparing a shaped foundry article, the method comprising the steps of:

preparing a premix by admixing;

aggregate;

a phenolic resole having a pH of at least 10.5;

an ester-curative; and an acidic methylene compound, until a substantially uniform premix is obtained;

shaping the premix to a desired configuration to provide a shaped premix; and thereafter, curing the shaped premix to provide a shaped foundry article;

wherein the acidic methylene compound is selected from the group consisting of:

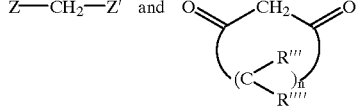

wherein Z and Z' may be the same or different and are selected from the group consisting of —CN, —$CO_2R$, —$CONR_2$", —CONHR",

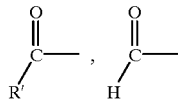

and combinations thereof;

further wherein R, R' and R" which may be the same or different are selected from the group consisting of branched and unbranched alkyl and alkenyl groups having from $C_1$ to $C_{10}$ carbon atoms and aryl groups including substituted aryl groups;

further wherein, $n \geq 2$; and further wherein R''' and R'''' may be the same or different and are selected from the group consisting of hydrogen, aryl groups, including substituted aryl groups, and alkyl and alkenyl groups having from $C_1$ to $C_{10}$ carbon atoms.

27. The method of claim 26 wherein the phenolic resole has a pH ranging from about 10.5 to about 13.5.

28. The method of claim 26 wherein the acidic methylene compound is present in an amount of from about 0.5% to about 8% based on the combined weight of the phenolic resole and the acidic methylene compound.

29. The method of claim 26 wherein the acidic methylene compound is first pre-mixed with the phenolic resole.

30. The method of claim 26 wherein the acidic methylene compound is first pre-mixed with the ester-curative.

31. A method for preparing a shaped foundry article, the method comprising the steps of:
preparing a premix by admixing;
aggregate;
a phenolic resole having a pH of at least 10.5; and
an acidic methylene compound, until a substantially uniform premix is obtained;
shaping the premix to a desired configuration to provide a shaped premix; and
thereafter, curing the shaped premix by applying a an ester-curative to the shaped premix to provide a shaped foundry article;
wherein the acidic methylene compound is selected from the group consisting of:

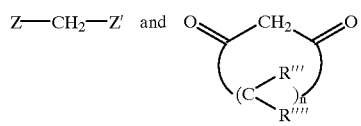

wherein Z and Z' may be the same or different and are selected from the group consisting of —CN, —CO$_2$R, —CONR$_2$", —CONHR",

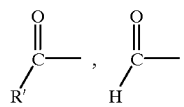

and combinations thereof;
further wherein R, R' and R" which may be the same or different are selected from the group consisting of branched and unbranched alkyl and alkenyl groups having from C$_1$ to C$_{10}$ carbon atoms and aryl groups including substituted aryl groups;
further wherein, n≧2; and
further wherein R'" and R"" may be the same or different and are selected from the group consisting of hydrogen, aryl groups, including substituted aryl groups, and alkyl and alkenyl groups having from C$_1$ to C$_{10}$ carbon atoms.

32. The method of claim 31 wherein the phenolic resole has a pH ranging from about 10.5 to about 13.5.

33. The method of claim 31 wherein the acidic methylene compound is present in an amount of from about 0.5% to about 8% based on the combined weight of the phenolic resole and the acidic methylene compound.

34. The method of claim 31 wherein the acidic methylene compound is first pre-mixed with the phenolic resole.

35. A binder composition comprising the product obtained by:
admixing a phenolic resole having a pH of at least 10.5; and
an acidic methylene compound;
wherein the acidic methylene compound is selected from the group consisting of:

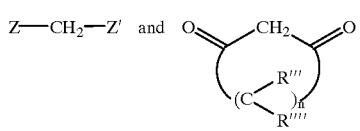

wherein Z and Z' may be the same or different and are selected from the group consisting of —CN, —CO$_2$R, —CONR$_2$", —CONHR",

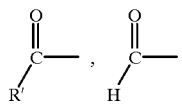

and combinations thereof;
further wherein R, R' and R" which may be the same or different are selected from the group consisting of branched and unbranched alkyl and alkenyl groups having from C$_1$ to C$_{10}$ carbon atoms and aryl groups including substituted aryl groups;
further wherein, n≧2; and
further wherein R'" and R"" may be the same or different and are selected from the group consisting of hydrogen, aryl groups, including substituted aryl groups, and alkyl and alkenyl groups having from C$_1$ to C$_{10}$ carbon atoms.

36. The composition of claim 35 wherein the acidic methylene compound is present in an amount of from about 0.5% to about 8% based on the total weight of the binder composition.

37. The composition of claim 35 wherein the phenolic resole is a potassium-based resin.

38. The composition of claim 35 wherein the phenolic resole is a sodium-based resin.

* * * * *